(12) United States Patent
Smith et al.

(10) Patent No.: US 8,977,705 B2
(45) Date of Patent: Mar. 10, 2015

(54) METHOD AND SYSTEM FOR DATA LOGGING AND ANALYSIS

(75) Inventors: Christopher A. Smith, Arlington, VA (US); Michael A. Bentkofsky, Falls Church, VA (US); Malini Kothapalli, Centreville, VA (US)

(73) Assignee: Verisign, Inc., Reston, VA (US)

( * ) Notice: Subject to any disclaimer, the term of this patent is extended or adjusted under 35 U.S.C. 154(b) by 1111 days.

(21) Appl. No.: 12/510,161

(22) Filed: Jul. 27, 2009

(65) Prior Publication Data

US 2011/0022678 A1    Jan. 27, 2011

(51) Int. Cl.
G06F 15/16 (2006.01)
G06F 15/177 (2006.01)
G06F 15/173 (2006.01)
H04L 29/06 (2006.01)
G06F 21/55 (2013.01)

(52) U.S. Cl.
CPC .......... *H04L 63/1425* (2013.01); *G06F 21/552* (2013.01); *G06F 2221/2101* (2013.01); *G06F 2221/2115* (2013.01)
USPC ............ 709/215; 709/203; 709/219; 709/224

(58) Field of Classification Search
USPC ........................................................ 709/215
See application file for complete search history.

(56) References Cited

U.S. PATENT DOCUMENTS

| 7,272,646 | B2 * | 9/2007 | Cooper et al. ................. 709/223 |
| 7,280,999 | B2 | 10/2007 | Chung et al. |
| 7,310,686 | B2 | 12/2007 | Uysal |
| 7,392,546 | B2 * | 6/2008 | Patrick ............................. 726/26 |
| 7,478,151 | B1 | 1/2009 | Maiocco et al. |
| 7,546,368 | B2 | 6/2009 | Drees et al. |
| 7,613,815 | B1 * | 11/2009 | Prakash et al. ................. 709/230 |
| 7,631,101 | B2 | 12/2009 | Sullivan et al. |
| 7,640,296 | B2 * | 12/2009 | Fuchs et al. .................... 709/203 |
| 7,650,317 | B2 * | 1/2010 | Basu et al. ........................ 706/12 |
| 7,657,540 | B1 * | 2/2010 | Bayliss ........................ 707/999.1 |
| 7,685,270 | B1 | 3/2010 | Vermeulen et al. |
| 7,694,016 | B2 | 4/2010 | Halley |
| 7,725,602 | B2 | 5/2010 | Liu et al. |
| 7,734,815 | B2 | 6/2010 | Leighton et al. |

(Continued)

OTHER PUBLICATIONS

Buchner, Alex and Mulvenna, Maurice. "Discovering Internet Marketing Intelligence through Online Analytical Web Usage Mining," ACM SIGMOD Record, col. 27, Issue 4, Dec. 1998, Pp. 54-61.*

(Continued)

*Primary Examiner* — Melvin H Pollack
(74) *Attorney, Agent, or Firm* — MH2 Technology Law Group, LLP

(57) ABSTRACT

A method of logging internet requests includes defining a plurality of field types of interest and receiving a request from the internet including one or more fields. The method also includes determining that a first field type of a first field of the one or more fields matches one of the plurality of field types of interest and caching at least a portion of the first field in a cache. The method further includes determining that a second field type of a second field of the one or more fields matches one of the plurality of field types of interest caching at least a portion of the second field in the cache. The method includes transmitting the cache to a server, determining, a number of occurrences of a field value of at least one of the first field type or the second field type, and providing a report including the number of occurrences of the field value.

21 Claims, 8 Drawing Sheets

(56) References Cited

U.S. PATENT DOCUMENTS

| | | | |
|---|---|---|---|
| 7,761,570 B1 | 7/2010 | Halley | |
| 7,769,826 B2 | 8/2010 | Gustafsson | |
| 7,809,818 B2* | 10/2010 | Plamondon | 709/223 |
| 7,809,857 B2* | 10/2010 | Anderson et al. | 709/245 |
| 7,814,202 B2 | 10/2010 | Drees et al. | |
| 7,925,747 B2 | 4/2011 | Kirwan et al. | |
| 7,925,782 B2 | 4/2011 | Sivasubramanian et al. | |
| 7,930,393 B1 | 4/2011 | Baumback et al. | |
| 7,933,951 B2 | 4/2011 | Sullivan et al. | |
| 7,949,724 B1* | 5/2011 | Schachter | 709/217 |
| 7,958,199 B2* | 6/2011 | Ferrari et al. | 709/211 |
| 7,962,616 B2* | 6/2011 | Kupferman et al. | 709/225 |
| 8,015,244 B2* | 9/2011 | King et al. | 709/203 |
| 8,069,481 B2* | 11/2011 | Judge | 726/22 |
| 8,302,030 B2* | 10/2012 | Soroca et al. | 715/810 |
| 8,346,887 B1* | 1/2013 | Kembel et al. | 709/217 |
| 8,364,540 B2* | 1/2013 | Soroca et al. | 705/14.64 |
| 8,484,656 B2* | 7/2013 | Raja et al. | 718/105 |
| 8,554,630 B2* | 10/2013 | Grant et al. | 705/14.73 |
| 8,621,034 B1* | 12/2013 | Kembel et al. | 709/217 |
| 8,661,008 B2* | 2/2014 | Bennett | 707/705 |
| 8,737,972 B2* | 5/2014 | Ramer et al. | 455/414.1 |
| 8,751,461 B2* | 6/2014 | Abraham et al. | 707/688 |
| 2003/0084057 A1 | 5/2003 | Balogh | |
| 2003/0084074 A1 | 5/2003 | Balogh et al. | |
| 2003/0084075 A1 | 5/2003 | Balogh et al. | |
| 2004/0039798 A1 | 2/2004 | Hotz et al. | |
| 2004/0122939 A1 | 6/2004 | Perkins | |
| 2004/0254926 A1 | 12/2004 | Balogh | |
| 2005/0027882 A1 | 2/2005 | Sullivan et al. | |
| 2005/0105513 A1 | 5/2005 | Sullivan et al. | |
| 2005/0138081 A1* | 6/2005 | Alshab et al. | 707/200 |
| 2005/0165889 A1* | 7/2005 | Muret et al. | 709/203 |
| 2007/0011737 A1* | 1/2007 | Bandini et al. | 726/14 |
| 2007/0070820 A1 | 3/2007 | Gallant | |
| 2007/0100808 A1 | 5/2007 | Balogh | |
| 2007/0180107 A1 | 8/2007 | Newton et al. | |
| 2007/0248029 A1 | 10/2007 | Merkey et al. | |
| 2007/0294419 A1 | 12/2007 | Ulevitch | |
| 2008/0034424 A1 | 2/2008 | Overcash et al. | |
| 2008/0059152 A1 | 3/2008 | Fridman et al. | |
| 2008/0071909 A1 | 3/2008 | Young et al. | |
| 2008/0098454 A1* | 4/2008 | Toh | 726/1 |
| 2008/0133729 A1 | 6/2008 | Fridman et al. | |
| 2008/0155254 A1 | 6/2008 | Stradling | |
| 2008/0201413 A1 | 8/2008 | Sullivan et al. | |
| 2009/0106211 A1 | 4/2009 | Balogh | |
| 2009/0106390 A1 | 4/2009 | Kirwan, Jr. et al. | |
| 2009/0157889 A1 | 6/2009 | Treuhaft | |
| 2009/0235359 A1 | 9/2009 | Abdulhayoglu et al. | |
| 2009/0276377 A1* | 11/2009 | Dutta et al. | 706/12 |
| 2009/0282027 A1 | 11/2009 | Subotin et al. | |
| 2009/0282028 A1 | 11/2009 | Subotin et al. | |
| 2009/0282038 A1 | 11/2009 | Subotin et al. | |
| 2010/0030897 A1 | 2/2010 | Stradling | |
| 2010/0077462 A1 | 3/2010 | Joffe et al. | |
| 2010/0138559 A1 | 6/2010 | Sullivan et al. | |
| 2010/0218040 A1 | 8/2010 | Bodmer et al. | |
| 2010/0257266 A1 | 10/2010 | Holmes et al. | |
| 2010/0274836 A1 | 10/2010 | Orentas et al. | |
| 2010/0274970 A1 | 10/2010 | Treuhaft et al. | |
| 2010/0287532 A1 | 11/2010 | Smith et al. | |
| 2010/0318858 A1 | 12/2010 | Essawi et al. | |
| 2011/0022678 A1 | 1/2011 | Smith et al. | |
| 2011/0029662 A1 | 2/2011 | Drees et al. | |
| 2011/0035469 A1 | 2/2011 | Smith et al. | |
| 2011/0035497 A1 | 2/2011 | Daly et al. | |
| 2011/0047292 A1 | 2/2011 | Gould et al. | |
| 2011/0051728 A1 | 3/2011 | Bhogavilli et al. | |
| 2011/0106891 A1 | 5/2011 | Gallant et al. | |
| 2011/0110267 A1 | 5/2011 | Gallant | |
| 2011/0161289 A1 | 6/2011 | Pei et al. | |
| 2012/0191716 A1* | 7/2012 | Omoigui | 707/740 |
| 2014/0025321 A1* | 1/2014 | Spanier | 702/62 |

OTHER PUBLICATIONS

Zaiane, O.R. et al. "Discovering Web Access Patterns and Trends by Applying OLAP and Data Mining Technology on Web Logs," Proceedings IEEE International Forum on Research and Technology Advances in Digital Libraries, Apr. 24, 1998, Pp. 19-29.*

Srivastava, Jaideep et al. "Web Usage Mining: Discovery and Applications of Usage Patterns from Web Data," ACM SIGKDD Explorations Newsletter, vol. 1, Issue 2, Jan. 2000, Pp. 12-23.*

International Search Report and Written Opinion of PCT Application No. PCT/US10/43067, mailed Sep. 17, 2010, 8 pages total.

* cited by examiner

Field Types of Interest
(Specific Embodiment)

| Source IP Address |
| --- |
| |
| DNS Query |
| DNS RR Type |
| DNS Response Time |
| |
| Ocsp-serial |
| http-accept-language |
| http-user-agent |
| |

METHOD AND SYSTEM FOR DATA LOGGING AND ANALYSIS

BACKGROUND OF THE INVENTION

The internet is an increasingly international network of computers that supports various forms and levels of communication. For instance, on the world wide web (WWW), information can be presented on universally available pages commonly known as websites. The internet also supports one-on-one communication between end-users via electronic mail, instant messaging, and voice over IP (VoIP) communication.

Increasingly, the internet is comprised of widely distributed network services such as search engines, redundant websites, and VoIP points of presence. These network services are deployed at many physical geographic sites but logically provide a network service. A challenge for widely deployed networked services is understanding the traffic usage patterns at all physical sites and across the entire grid of physical sites.

In order to service some internet requests, the Domain Name System (DNS) is utilized. The DNS is a distributed database system based on a client-server model. The nodes of this database are referred to as nameservers. Each domain or subdomain has one or more authoritative DNS servers that publish information about that domain and the name servers of any domains subordinate to it. The top of the hierarchy is served by servers referred to as root nameservers, that is, servers that are queried when looking up or resolving a top-level domain (TLD) name. Other internet requests include IP requests, OCSP requests, and Whois requests.

For the operator of the network services, tracking of requests is desirable. However, current systems lack the ability to provide tracking data at a level of depth desired by system operators. Thus, there is a need in the art for improved methods and systems for logging internet requests and reporting information related to such internet requests.

SUMMARY OF THE INVENTION

The present invention relates generally to data networks. More specifically, the present invention relates to methods and systems for calculating the most frequently recurring characteristics of a network service. Merely by way of example, the invention has been applied to a system that caches data related to field types of interest as they are received at front end processors, transmits the cached data to a summarization server, which then sorts and reports on the most frequently recurring values for each field type of interest. The methods and techniques can be applied to DNS traffic, OCSP traffic, Whois traffic, and the like.

According to a particular embodiment of the present invention, the fields of a request are analyzed and the number of times a particular value for the various field types of interest occurs is counted to determine and then report on the most frequently recurring values for each field type of interest. As an example, when a request is received by a processing engine, the fields in the request that have field types matching field types of interest are cached. The cache is then processed by a server to determine the most commonly occurring values for the field types of interest. In some embodiments, values are calculated for fields that are concatenations of other fields, a setting available through configuration. The most frequently recurring values for each field type of interest (e.g., top 10 values for particular field types of interest) are then reported using a reporting system, typically to a system operator.

According to an embodiment of the present invention, a method of logging internet requests is provided. The method includes defining a plurality of field types of interest and receiving a request from the internet. The request includes one or more fields. The method also includes determining that a first field type of a first field of the one or more fields matches one of the plurality of field types of interest caching at least a portion of the first field in a cache. The method also includes determining that a second field type of a second field of the one or more fields matches one of the plurality of field types of interest and caching at least a portion of the second field in the cache. Moreover, the method includes transmitting the cache to a server, determining, at the server, a number of occurrences of a field value of at least one of the first field type or the second field type, and providing a report including the number of occurrences of the field value.

According to another embodiment of the present invention, a method of reporting on internet requests is provided. The method includes defining a plurality of field types of interest and receiving a first plurality of requests from the internet at a first processing engine. Each of the first plurality of requests includes one or more first fields. The method also includes caching a first field of the one or more first fields in a first cache and caching a second field of the one or more first fields in the first cache. The method further includes receiving a second plurality of requests from the internet at a second processing engine. Each of the second plurality of requests includes one or more second fields. The method includes caching a third field of the one or more second fields in a second cache and caching a fourth field of the one or more second fields in the second cache. Moreover, the method includes transmitting the first cache to a server, transmitting the second cache to the server, determining, at the server, a top field value characterized by a higher number of occurrences than other field values, and providing a report including the top field value and the number of occurrences of the top field value.

According to a specific embodiment of the present invention, a system is provided. The system includes a plurality of processing engines coupled to the internet and operable to receive requests from the internet. Each of the requests includes one or more fields. The system also includes a server coupled to the plurality of processing engines and a reporting system coupled to the server. Each of the plurality of processing engines includes a first computer-readable medium storing a first plurality of instructions for controlling a first data processor to form a cache. The first plurality of instructions includes instructions that cause the first data processor to received a plurality of requests over the Internet and instructions that cause the first data processor to store, in the cache, field values for field types of interest for a subset of the plurality of requests received over the Internet. The first plurality of instructions also includes instructions that cause the first data processor to increment a counter associated with the a total number of the subset, instructions that cause the first data processor to determine a time period for forming the cache, and instructions that cause the first data processor to transmit the cache to the server.

The server includes a second computer-readable medium storing a second plurality of instructions for controlling a second data processor to form a report. The second plurality of instructions includes instructions that cause the second data processor to increment counters associated with field values for the plurality of field types of interest, instructions that cause the second data processor to sort the field values based on the counters, and instructions that cause the second data processor to transmit the report to the reporting system.

Many benefits are achieved by way of the present invention over conventional techniques. For example, embodiments of the present invention provide methods and systems for logging and reporting on the top N field types of interest to the service providers. The audience of the data collected by the present invention could be business decision makers who want to know how the service is being used, system operators who monitor the system for attack patterns, and system implementers who monitor the service to make improvements to it based on the usage pattern. Reporting of the most frequently occurring field values is performed in near real-time across front end processors to average the network traffic.

One of the benefits provided by embodiments of the present invention is the generic nature of the system and how it can be used for any or all network services. Network services that receive encrypted data could also be monitored for traffic patterns by the present invention. In such a case, external service monitors have a disadvantage in that they lack the decryption mechanisms needed to decrypt data. These and other embodiments of the invention along with many of its advantages and features are described in more detail in conjunction with the text below and attached figures.

DETAILED DESCRIPTION OF SPECIFIC EMBODIMENTS

In order to track and report information related to internet requests received by front end processors, it is possible to record transactions or queries (e.g., DNS queries) in a database or log file (e.g., a text file stored on disk). These log files can then be post-processed with other programs or scripts to collect data about the received requests. Data of interest to the service providers includes the most frequently querying IP addresses, the most popular queries, and the like.

The inventors have determined that a post-processing system as described above does not provide either the speed or the flexibility desired by system audience. In a typical system providing a network service, hundreds of thousands of queries can be received in a period of a few seconds. Thus, recording hundreds of thousands of queries in a database or in a log file on disk requires considerable resources, most notably disk space, and has a direct impact on the overall performance of the system being monitored since the time and resources required to commit the history to database or disk typically causes a system to pause momentarily before servicing the next transaction or request. Additionally, service providers desire reporting on a periodic and rapid basis (e.g., every four seconds). A program or script that post-processes the database or log file may not be able to keep up with the rate of transactions or requests in order to be able to report at the desired rate. Systems which record transaction or request histories to log files also have the potential to expose sensitive data when these histories are written to disk, data that could be captured by an intruder or disgruntled employee. Embodiments of the present invention provide solutions to these and other problems by enabling near real-time reporting of information related to internet requests as described more fully throughout the present specification.

Figures 1, 2:
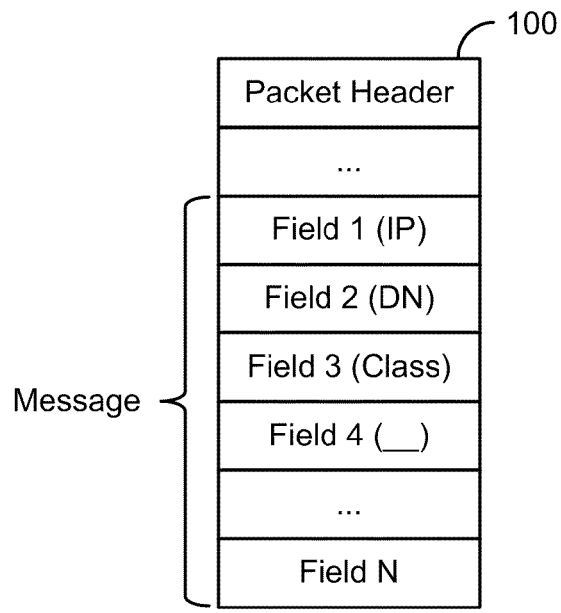
FIG. 1 is a simplified illustration of a request received over the internet.
FIG. 2 is a table listing field types of interest according to a specific embodiment of the present invention.

FIG. 1 is a simplified illustration of a request received over the internet. In the request 100 illustrated in FIG. 1, the request includes one or more fields. As an example, the request can include N fields as shown in FIG. 1. The particular number of fields in the message will depend on the particular request as will be described more fully below. For some applications, the fields included in the message may be grouped into four general categories: IP, DNS, OCSP, and Whois. Each of these fields is characterized by a three-tuple: field type, field length, and field value. In some requests, the field length will not be specified in the field as it will be evident to one of skill in the art. Depending on the application, the three-tuples will vary as appropriate to the particular application.

Embodiments of the present invention provide systems and techniques for calculating the most frequently recurring characteristics of a network service. According to embodiments of the present invention, each network request is described as a "Request" and each of the elements of the request (e.g., Domain Name or User-Agent) is described as a "Field." As described below, requests are sent to multiple front end processors (also referred to as processing engines) all serving the same kinds of requests, but with different field values depending on the type of service requested by the user. The processing engines (PEs) process requests sequentially and pick out the "fields of interest," which are fields with a field type matching a field type of interest. The terms processing engine (PE), protocol engine, front end processor, front-side processor, and front-facing processor are other terms that can be used to describe the PEs and should be given a meaning equivalent to the term PE. Each PE picks out the same fields, but since each field in the request will have different field values, the methods and systems described herein determine the most commonly occurring field values. Each processing engine processes each request and, after caching data associated with the field types of interest, then sends the short term cache to a summarization service referred to as a query log daemon (qlogd), Query Summarizer, or Query Log Server. The PE in actuality uses numeric representation (e.g., field 7) for each field name (e.g., ocsp-serial). In turn, the query log daemon is configured to know that "field 7" means "ocsp-serial."

The query log daemon processes each of the caches from various PEs (also referred to as bundles of requests) and internally counts the number of times a field value is seen. It then periodically reports the top values reported to it from the various PEs. This explanation is merely a summary and additional description related to each of these processes is provided below.

The following tables provide examples of fields that can be utilized to form a list of field types of interest. The field types listed in Tables 1-3 are not intended to limit the present invention, but are merely provided as examples of various field types in different protocols. Other field types can also be utilized as field types of interest in various implementations. One of ordinary skill in the art would recognize many variations, modifications, and alternatives. As illustrated in Tables 1-3, some field types (e.g., Source IP Address) are utilized in several of the protocols or services. In the example of a Source IP Address, source information is provided in headers for several protocols, enabling responses to be directed to the correct source. Another example of a field type that is similar across several services is the time field type, providing information on the time required to service a request. Other field types are unique to a particular protocol.

TABLE 1

DNS Fields

| Field Type | Field Length (bytes) | Field Value |
| --- | --- | --- |
| 8 (Query Name) | 15 | www.example.com |
| 7 (Source IP Address) | 4 | 10.10.10.10 |
| 9 (DNS Type) | 2 | 01 (A) |
| 10 (Response) | 1 | 0 (No error response) |
| 11 (Time) | 4 | 17 ms |

TABLE 2

OCSP Fields

| Field Type | Field Length (bytes) | Field Value |
| --- | --- | --- |
| 20 (Request-Method) | 2 | POST |
| 21 (Host) | 17 | Ocsp.verisign.com |
| 7 (Source IP Address) | 4 | 172.28.111.42 |
| 22 (User-Agent) | 4 | IPhone 4.2.11 |
| 23 (Accept-Language) | 2 | EN, DE |
| 24 (ocsp-issuer-namekeyhash) | 80 | Verisign Class 3 EV SSL Issuer |
| 25 (ocsp-serial) | 15 | www.example.com |

TABLE 3

Whois Fields

| Field Type | Field Length (bytes) | Field Value |
| --- | --- | --- |
| 7 (Source-IP Address) | 4 | 172.28.111.5 |
| 30 (Query Name) | 10 | Enom, Inc. |
| 31 (Query Type) | 1 | 2 (Registrar) |
| 32 (Time) | 4 | 2 ms |

It should be noted that the fields illustrated in Tables 1-3 are simplified for purposes of illustration and are not intended to limit the scope of the invention. As an example, the actual value for the ocsp-serial field is not "www.example.com," but would instead be a unique identifier that can be easily translated into the illustrated value. Additionally, it should be noted that the various fields listed in the above tables are not an exhaustive list and other fields of interest are included within the scope of the present invention. Thus, additional fields can be received as part of requests that are received by the processing engines and utilized as field types of interest as more fully described throughout the present specification.

The requests that are received over the internet generally adhere to protocols agreed upon by the standardization communities. Thus, the fields are extracted based upon the fields as defined in the protocols. These fields are then cached when the field type matches a field type of interest. Therefore, a cached field has a field type, a field length, and a field value (also referred to as type, length, and value).

FIG. 2 is a table listing field types of interest according to a specific embodiment of the present invention. The field types of interest are drawn from lists of fields as illustrated in Tables 1-3 and are typically defined by a system implementer or other appropriate personnel. As described more fully in reference to FIG. 3, the field types of interest in query or/and response data are recorded by processing engines (PEs). The processing engine then sends this cached data to a Query Summarizer. Thus, the application can define the types of data that it wants to send to the Query Summarizer. The field types of interest in FIG. 2 include the source IP address, which, as discussed above, can be common to several protocols. The field types of interest also include DNS query related fields. Additionally, the field types of interest include OCSP query related fields. The present invention is not limited to these particular categories of field types of interest, but can be applied to other protocols. One of ordinary skill in the art would recognize many variations, modifications, and alternatives.

As an example of an implementation of the present invention, each DNS query includes a domain name and a resource record (RR) type (i.e., a valid DNS RR type). A current list of valid DNS RR types is available at http://www.iana.org/assignments/dns-parameters. A few examples of the various types are given in Table 4:

TABLE 4

| Resource Record Type | Value | Meaning |
| --- | --- | --- |
| A | 1 | a host address |
| NS | 2 | an authoritative name server |
| CNAME | 5 | The canonical name for an alias |
| MX | 15 | mail exchange |
| TXT | 16 | text strings |
| Unassigned | 256 | Unassigned |

Figure 3:
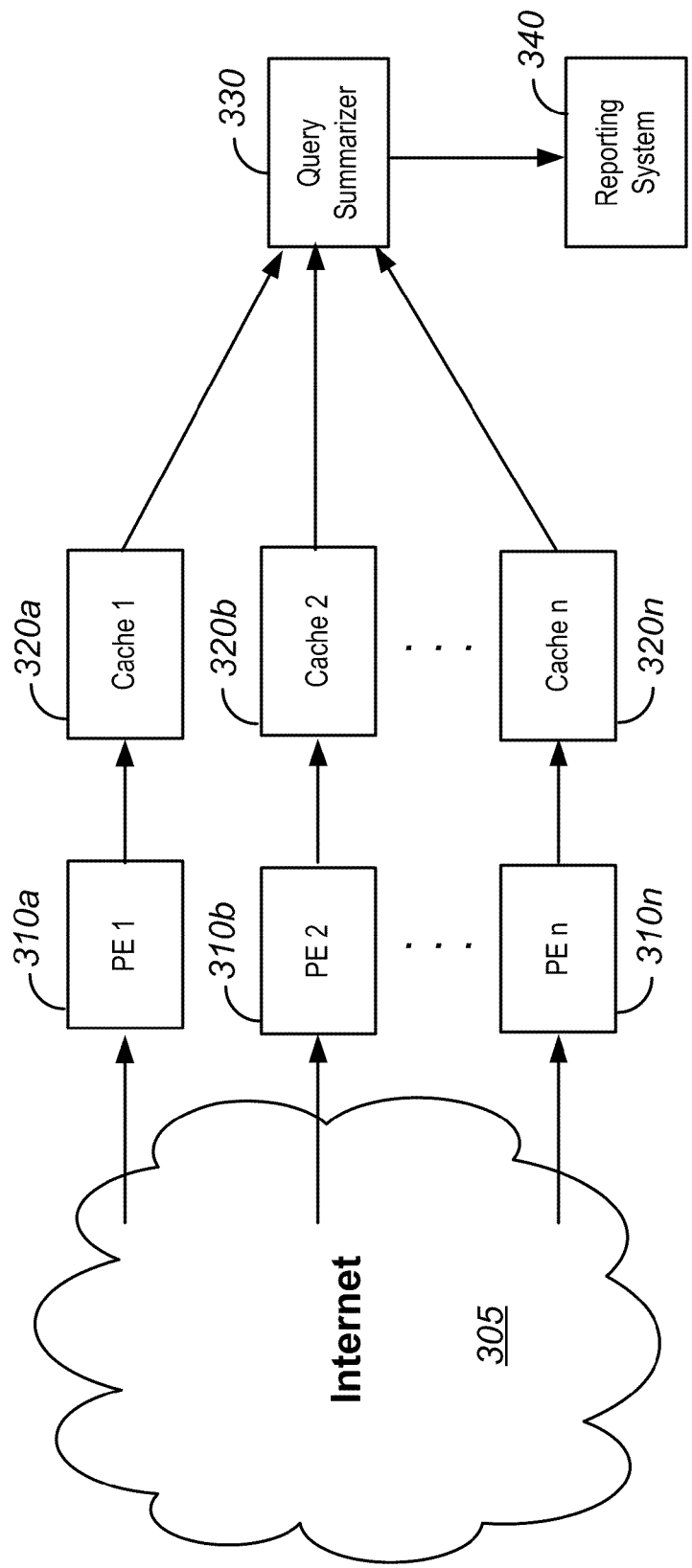
FIG. 3 is a simplified diagram illustrating a system architecture according to an embodiment of the present invention.
Figure 8:
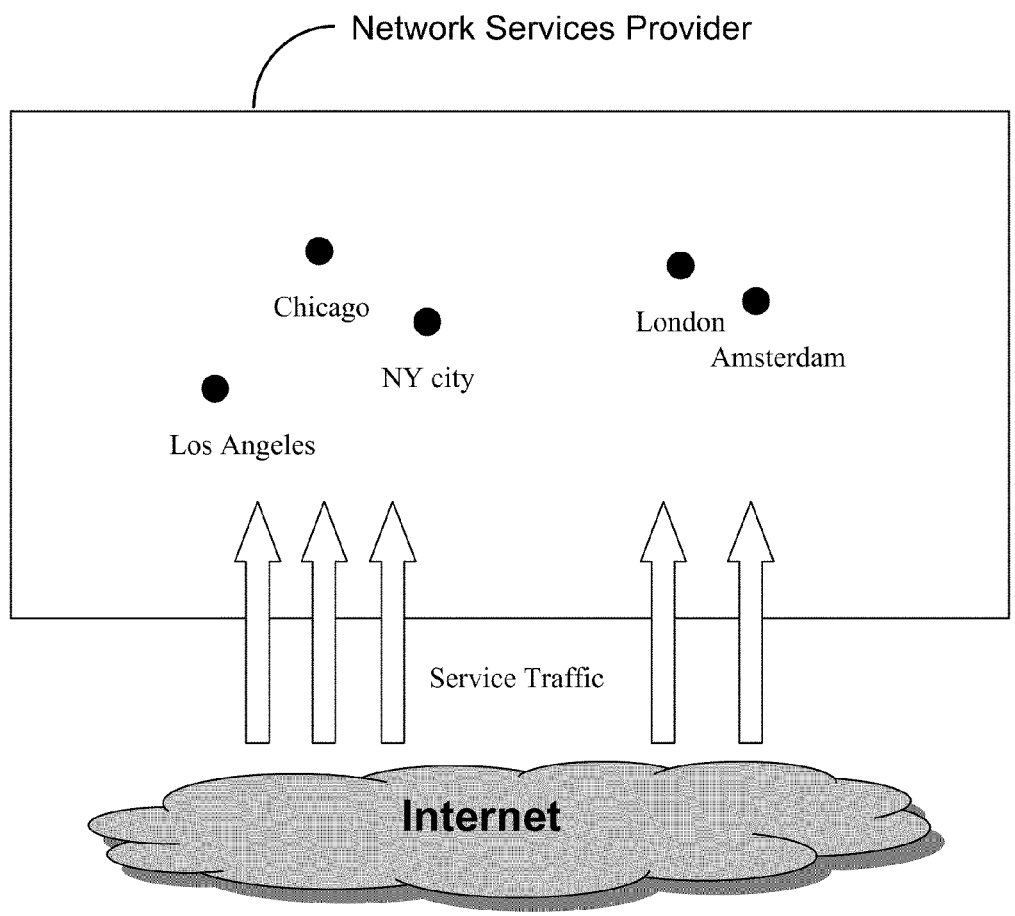
FIG. 8 is a simplified diagram illustrating geographically dispersed sites for a service according to an embodiment of the present invention.

FIG. 8 illustrates a network service provider servicing Internet traffic according to an embodiment of the present invention. As shown in FIG. 8, a multi-site deployment servicing traffic from the Internet is utilized in some embodiments of the present invention. The geographically dispersed network service provider handles traffic from the Internet with multiple points-of-presence making up the entire service. Several cities are shown as serviced by the network services provider for purposes of illustration. Service traffic is received by the network services provider from the Internet and service is provided as appropriate to the particular application. FIG. 3, described below, could represent one such site servicing network requests.

FIG. 3 is a simplified diagram illustrating a system architecture according to an embodiment of the present invention. As illustrated in FIG. 3, requests are received at processing engines PE1 (310a), PE2 (310b), through PEn (310n). Although only three processing engines are illustrated in FIG. 3, typical implementations will utilize one or more processing engines as appropriate to the particular application. In a particular embodiment of the present invention, the processing engines form part of a domain name resolution system that provides DNS services over the Internet. The processing engines are typically co-located at a site.

As requests are received by the processing engines, each of the processing engines processes the requests and writes data to a cache illustrated by Cache 1 (320*a*), Cache 2 (320*b*), and Cache n (320*n*). The contents of the various caches are described more fully below. After a predetermined time interval, or based on the cache reaching a predetermined size, the processing engine (PE) transmits the cache to Query Summarizer 330. Query Summarizer 330 processes the caches from the various PEs to determine a top-n list of field type of interest ranked by number of occurrences of particular field values. Reports are provided to Reporting System 340 (which may be accessible to a System Operator) at a predetermined interval as more fully described below.

FIG. 8 is a simplified diagram illustrating geographically dispersed sites for a service according to an embodiment of the present invention. Each site services network requests, for example, DNS queries, Whois queries, and the like. The sites servicing network requests are illustrated as operating in several cities: Los Angeles, Chicago, London, and the like. Referring to FIG. 3, the processing engines PE1 through PEn could be located at one of these sites that are servicing network requests. Thus, FIG. 8 provides an overview of the sites illustrated in FIG. 3.

Figure 4:
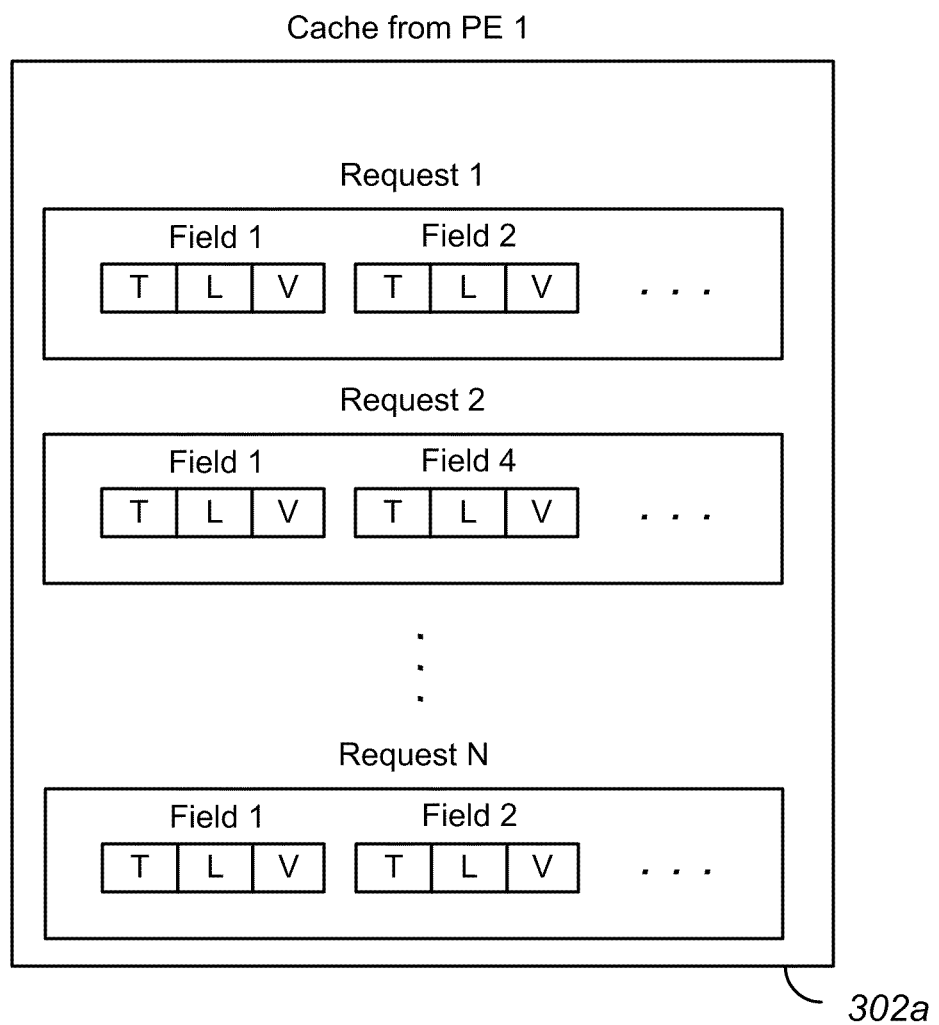
FIG. 4 is a simplified diagram of a cache according to an embodiment of the present invention.

Referring to FIG. 4, the processing engine buffers or caches the application-specific data from the fields in a three-tuple format: a field type, a field length, and a field value (T/L/V). Each message from a PE may have multiple fields including these three-tuples. The PE buffers or caches information from multiple messages before it sends out the cache to the Query Summarizer. Referring to FIG. 4, a cache from PE1 is illustrated. A first request (Request 1) is received and processed by the processing engine. In an embodiment, the request includes one or messages (typically one message) and each of the one or more messages includes one or more fields. PE1 iterates on the message(s) and compares each of the field types in the request to the field types of interest (e.g., as illustrated in FIG. 2). If a field type matches one of the field types of interest, then the three-tuple for that field type (type/length/value (i.e., T/L/V)) is stored in the cache 302*a*. In the illustrated example, the field types for Field 1 and Field 2 matched one of the field types of interest and Field 1 and Field 2 are cached. Other fields from the Request 1 are also illustrated by the ellipsis. Thus, the field type, the field length, and the field value for Field 1 and Field 2 are stored in cache 302*a*. Additional discussion related to field type/length/value is provided throughout the present specification and more particularly below.

A second request (Request 2) is also received and processed by PE1. In the second request, the field types of the first field (Field 1) and the fourth field (Field 4) match one of the field types of interest and are cached. In this example, the field types of Field 2 and Field 3 are not field types of interest. That is, the particular field types in Field 2 and Field 3 do not match any of the field types of interest in the list stored by the processing engine. In some embodiments, Field 2 has the same type for all requests due to compliance with a standard. In other embodiments, some requests may not have Field 2 and because it is missing, it is not cached. Thus, as PE1 iterates on the fields in the message(s) contained in Request 2, Field 2 and Field 3 are skipped and not included in cache 302*a*. PE1 continues to receive and process additional requests up through Request N as illustrated in FIG. 4. It should be noted that a PE will cache the same field types across multiple requests. Thus, in the example in FIG. 4, Field 1 and Field 2 are cached for Request 1, Field 1 and Field 4 are cached for Field 2, and Field 1 and Field 2 are cached for Request N, because these fields have field types that match the field types of interest. In other embodiments, the particular fields that are cached depend on the particular field types in the various fields.

In order to provide examples of field types, field lengths, and field values, after receiving four requests, a PE might have the information illustrated in Table 5 in its request cache. As discussed above, the data related to the requests is cached in the format of field type:length:value. In this example, seven fields from each of the four requests have a field type matching a field type of interest and are stored in the cache. The requests illustrated in Table 5 can have more than seven fields, but since only seven fields have field types matching the field types of interest, only the matching seven fields are cached.

TABLE 5

| Request 1 | | |
|---|---|---|
| Request-Method | 4 | POST |
| Host | 17 | ocsp.verisign.com |
| Source IP Address | 4 | 172.28.111.42 |
| User-Agent | 4 | IPhone 4.2.11 |
| Accept-Language | 2 | EN, DE |
| Ocsp-issuer-namekeyhash | 80 | Verisign Class 3 EV SSL Issuer |
| Ocsp-serial | 16 | www.example1.com |
| Request 2 | | |
| Request-Method | 3 | GET |
| Host | 17 | ocsp.verisign.com |
| Source IP Address | 4 | 172.28.25.2 |
| User-Agent | 4 | Mozilla 5 |
| Accept-Language | 2 | EN |
| Ocsp-issuer-namekeyhash | 80 | Verisign Class 3 Public CA |
| Ocsp-serial | 18 | login.example2.com |
| Request 3 | | |
| Request-Method | 4 | POST |
| Host | 15 | ocsp.thawte.com |
| Source IP Address | 4 | 30.18.42.12 |
| User-Agent | 4 | Microsoft Crypto API 6.0 |
| Accept-Language | 2 | ES |
| Ocsp-issuer-namekeyhash | 80 | Verisign Class 3 EV SSL Issuer |
| Ocsp-serial | 14 | *.example3.com |
| Request 4 | | |
| Request-Method | 4 | POST |
| Host | 17 | ocsp.verisign.com |
| Source IP Address | 4 | 10.42.7.19 |
| User-Agent | 4 | Mozilla 3.0 |
| Accept-Language | 2 | EN |
| Ocsp-issuer-namekeyhash | 80 | Verisign Class 3 EV SSL Issuer |
| Ocsp-serial | 16 | www.example4.com |

Figure 6:
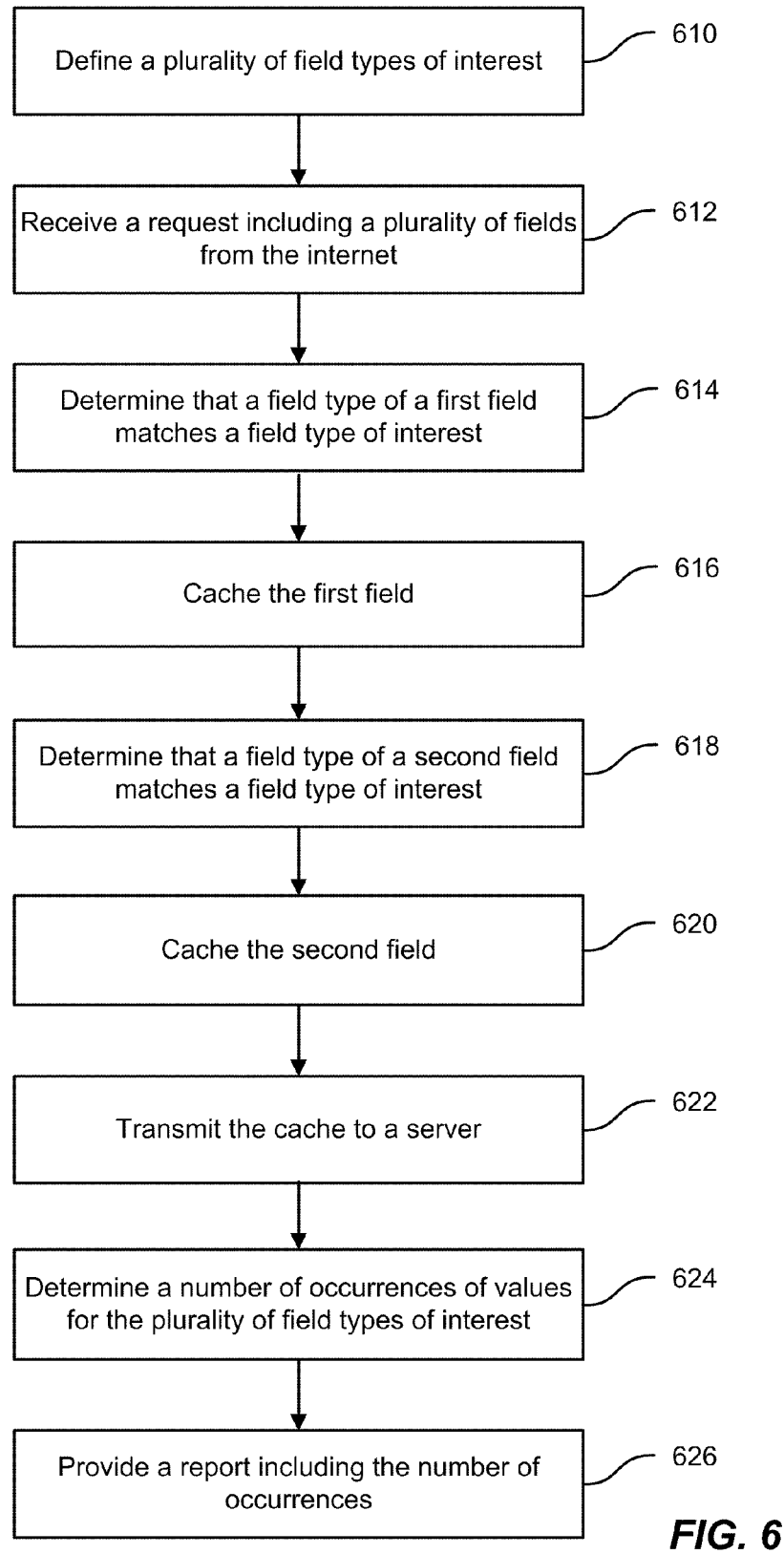
FIG. 6 is a simplified flowchart illustrating a method of logging internet requests according to an embodiment of the present invention.

FIG. 6 is a simplified flowchart illustrating a method of logging internet requests according to an embodiment of the present invention. A plurality of field types of interest are defined (610), typically by a system operator. A request is received over the internet including plurality of fields (612). An exemplary request is illustrated in FIG. 1. A determination is made that a field type of a first field in the request matches one of the plurality of field types of interest (614). In response to determining the match, at least a portion of the first field is cached (616). As an example, if one of the field types of interest is Source IP Address and the field includes a field type of Source IP Address, then data related to this field is cached, typically in the format of field type, length, and value. The caching of the field length is optional in some embodiments.

A determination is made that a field type of a second field in the request matches one of the plurality of field types of interest (618). In response to determining the match, at least a portion of the second field is cached (620). The cache is transmitted to a server (622). At the server, the caches are processed and sorted to determine a number of occurrences of values for the plurality of field types of interest (624). For example, for the Source IP Address example above, the values of the most frequently occurring Source IP Addresses could be sorted and listed in rank order. A report of the number of occurrences is provided (626), typically to the system operator.

It should be appreciated that the specific steps illustrated in FIG. 6 provide a particular method of logging and reporting on internet requests according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
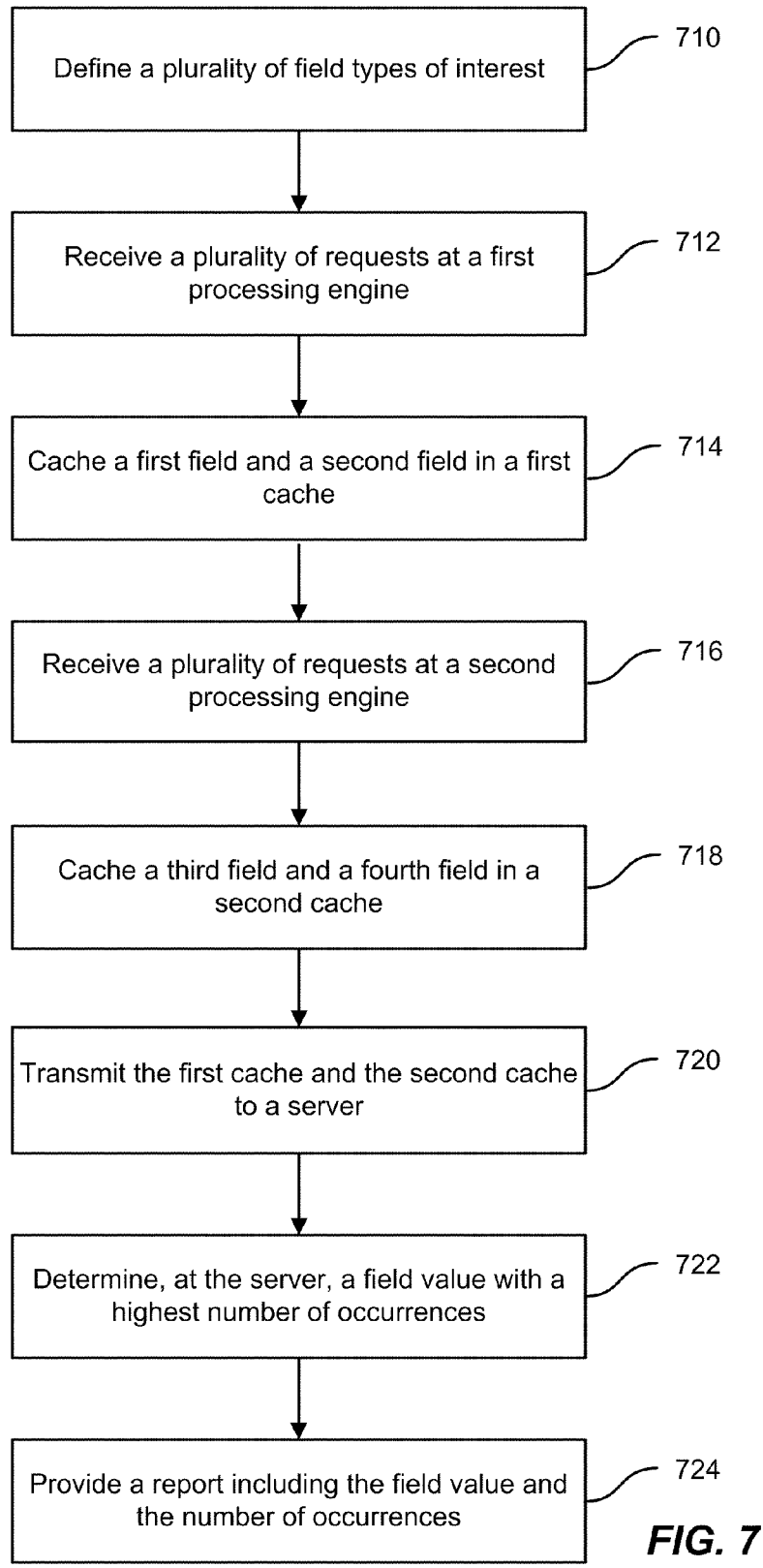
FIG. 7 is a simplified flowchart illustrating a method of reporting internet queries according to an embodiment of the present invention.

FIG. 7 is a simplified flowchart illustrating a method of reporting internet queries according to an embodiment of the present invention. A plurality of field types of interest are defined (710), typically by a system operator. A plurality of requests are received at a first processing engine (712). The processing engine (PE) processes the request and additionally determines if field types included in the fields in the request match the defined types of interest. Based on matches between the field types and the field types of interest, a first field and a second field are cached in a first cache (714). An example of a cache is illustrated in FIG. 4. A plurality of requests are also received at a second PE (716). Similar to the operation of the first PE, the requests are processed and fields with field types matching the field types of interest are cached. Thus, a third field and a fourth field are cached in a second cache (718).

The first cache and the second cache are transmitted to a server (720), typically based on the cache reaching a predetermined size or a time limit expiring. The server determines the field value with the highest number of occurrences (722). Determining the most frequently recurring field value is generally part of a larger process of determining a top N list (e.g., a top 10 list) of the most frequently recurring field values. A report is provided including the field value and the number of occurrences for the field value (724). As an example, if the Domain Name in a DNS query is a field type of interest, then the field value (e.g., www.verisign.com) for the most queried Domain Name would be listed in the report, along with other field values in decreasing order.

It should be appreciated that the specific steps illustrated in FIG. 7 provide a particular method of reporting the most frequently recurring field values for internet requests according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

In an embodiment, the communication protocol between the client and the server is stateless and unreliable. For this implementation, we assume that it is acceptable to miss some query log packets (i.e., internet requests). Query logging supports a single threaded model. Whenever the processing engine receives a response from a look-up engine, it adds the query and response data to its buffer or cache using the query logging API and sends the cached data to the Query Summarizer at a configurable, predetermined interval (e.g., every 1 second) or when the cache (e.g., cache 302*a*) is full. The specific protocol used for communication does not limit embodiments of the present invention, but is merely utilized to demonstrate one implementation of the present invention. The cached or buffered data is sent over UDP to the Query Summarizer 330.

In a particular embodiment, QueryLogPacket is a class that defines the wireline format of the packet sent to the server. The class also defines the interface to add messages with multiple fields to the buffer and the interface to read messages from the wireline packet. The QueryLogPacket class has a concept of message and field. A message defines the start of a new message boundary, whereas a field defines an attribute of a message which is in three-tuple format: a field type, a field length (also referred to as field size), and a field value. A message can have one or more such fields. QueryLogPacket includes a header and a payload.

In implementations in which a query log packet is a UDP packet, the packet size is limited to 65,493 bytes (65,535—UDP header size). The header of a query log packet is a predetermined number of bytes (e.g., 10 bytes). An exemplary header is illustrated in Table 6.

TABLE 6

| Field | Size (bytes) | Values |
|---|---|---|
| Version | 1 | Set to 1. This value changes whenever the packet format changes. |
| Reserved (could be used as payload type) | 1 | Set to 0. |
| Sequence | 4 | Incremented for every packet. Query Summarizer uses this number to track missing packets. |
| Total Packet Length | 2 | Minimum value is 6 and maximum value is 65,193 |
| Message Count | 2 | Minimum value is 0. |

The payload of a query log packet will not be larger than 65,483 bytes when the packet is a UDP packet. In an embodiment, each message added to the packet has the format illustrated in Table 7.

TABLE 7

| Field | Size (bytes) | Values | Comment |
|---|---|---|---|
| Message Type | 1 | The type of the message | Who is and tgv are exemplary message types |
| Field Count | 1 | Total number of fields in this message | Defined once per message. Each message may have multiple three-tuples as shown in the next three rows. |
| Field Type | 1 | The type of the field as defined by the application | Defined for every field. |
| Field Length | 2 | Length of the field value | Defined for every field. |
| Field Value | Variable | Contains the field | Defined for every field. |

The "Message Type" and "Field Count" indicate the start of a new message and the end of an earlier message. The payload begins with the following fields before the messages are added to the cache. As discussed above, these are defined in a three-tuple format of Field type, Field length, Field data (value).

In some implementations, the processing engine can define a source. In this case, a source field can be added to the packet. Additionally, a packet timestamp of type struct timeval can be added to provide a timestamp when the packet is initialized.

The fields in every message begin with a MSGTIMESTAMP (field type 6). The value in this field is the difference between the packet timestamp and the message timestamp. This field will be set in the call to newMessage( ) method in the QueryLogWriter class described below.

Once initialized, a QueryLogWriter object is fed messages with multiple fields. Each field of a message can be as simple as a piece of the parsed query or response or could contain the actual inbound message or outbound response. A particular embodiment picks out the important pieces of requests and responses (i.e., the fields of interest) rather than packaging the entire front-end request or response. Each message is also tagged with an application defined type, which is intended to allow multiple types of messages at the query summarizer. Examples might include:

An inbound query
An outbound response (note, may choose to put request/response in a single message rather than separating them)
A notation in the log (e.g., checkpoint message)
A notation of a truncated message.

The inventors have determined that there are potentially many application reasons for distinguishing types of messages, perhaps some with very different common fields. In an embodiment, the programming interface to add messages and fields of a message is:

the content to the buffer. The newMessage method also checks if it is time to send the buffer, sends the buffer, and resets the timer.

This interface is intended to be used with calls to newMessage( ) with each event (e.g., front-end request) and numerous calls to addField( ) with each important aspect to be recorded along with the message. Fields may repeat within messages, and may be formatted in any way convenient to the caller. However formatting will be preserved in the Query Summarizer meaning appropriate translation will be done to read the log packets. For example, if the field is added as a 4-byte integer, appropriate platform translation is done during writing (e.g., htonl( )) and reading back (e.g., ntohl( )).

Referring once again to FIG. 3, the Query Summarizer 330, also referred to as qlogd, is a network element running on the network, monitoring servers (i.e., PEs) at each resolution site. The Query Summarizer is a daemon process running on a configurable interface and port, listening for UDP packets from PEs containing loggable events, such as queries. Each UDP packet may contain one or more loggable events. As discussed above, the PE iterates over each received request and caches the three-tuples of information illustrated in FIG. 4: a field type, a field length, and a field value. The Query Summarizer keeps track of the number of times these three-tuples have been seen, and, at a configurable interval, reports a top n list for the configured list of field types of interest. Because the field types that are tracked is a parameter set via configuration, the system operator is able to receive a report of the top field types, such as the most queried domain names. A list of the top 20 most queried domain names could then be provided as an example of the top values (the actual domain names) for the field type of interest (query name).

Once the packet is read from the UDP socket, the Query Summarizer uses the QueryLogReader class to parse the packet and convert the data into human-readable format. The

```
class QueryLogWriter {
public:
    // Note that if either message returns false, the current message is cleared from the
    // the buffer. In that case, any calls to addField( ) will fail until a newMessage( )
    // call succeeds.
    // Preparing a new message. The last message has been committed. Returns false
    // when the outbound message buffer is too full to add another message.
    bool newMessage(uint8_t type);
    // Adds a new field to the current message. A new message has been started.
    // Returns false when the outbound message buffer is too full to continue.
    bool addField(unsigned short type, unsigned short length, const void * value);
    // Signals the end of the current message
    void commitMessage( );
    // Normally PE wouldn't call this method. When PE shuts down,
    // it can use this method to flush the buffer.
    void send( );
};
```

The newMessage and addField methods attempt to shield the user from a cache (i.e., buffer) full event. If the cache (i.e., buffer) is full, these methods send the buffer to the Query Summarizer and requeue the last message to the beginning of the buffer. Once this is successful, the methods attempt to add QueryLogReader class provides the API to iterate over the packet received and validate it. If the message is not in the standard query log packet format, the reader throws a packetformat exception. The QueryLogReader class provides the API to read each message and each field in that message.

```
class QueryLogReader {
public:
    QueryLogReader(const void* buffer);
    // This call returns true if there are more messages to read in the packet
    bool getNextMessage( ) const;
    // Gets the type of message for the current message. A call to 'getNextMessage( )' must
    // return true before this call can be made.
```

```
   unsigned short getMessageType( ) const;
   // Gets the field count in the current message. A call to 'getNextMessage( )' must
   // return true before this call can be made.
   unsigned short getFieldCount( ) const;
   // Gets the source of the current message. In this terminology, source means the name of
   // the processing engine that sent the message to the query logger.
   const string getPacketSource( ) const;
   // Gets the time when the packet was initialized.
   const struct timeval & getPacketTime( ) const;
   // Gets the message count in the packet
   unsigned short getMessageCount( ) const;
   // Gets the sequence in the packet
   unsigned int getPacketSequence( ) const;
   // This method returns true if there are more fields to be read in the current message.
   // A call to 'getNextMessage( )' must return true before this call can be made.
   bool getNextField(int & type, void *& data, unsigned & length);
};
```

For example, in a DNS setting, PEs may be caching messages containing each received query (name and type) and response code for said query. The Query Summarizer then keeps track of all three items—names, types, and response codes—and reports every ten seconds the top twenty most-queried names and types. Upon startup, qlogd configures and initializes itself. Before going into service, it spawns a thread, giving it two running threads. The first thread, the service thread, reads packets from PEs. For each received packets, it iterates over the messages contained in the packet and then iterates over all fields contained in each message. A running total for the number of times the value from a field type-length-value three tuple occurs is determined, typically using a counter. Once a configured number of seconds have elapsed or the cache size has exceeded a configurable size, the service thread swaps the current cache out for a new, blank one and then signals the second thread, an idle reporting thread, via a conditional variable to generate a report based on the old cache. The reporting thread iterates over the cache and builds up vectors of all fields. These vectors are then sorted, and all but the top n items—or the whole list if it is too small—are deleted. From these lists a reporting message is built, reporting the top n values for each field type of interest. The process then reiterates until told to shut down. The use of two threads is not required by embodiments of the present invention and other architectures are included within the scope of the present invention.

Figure 9:
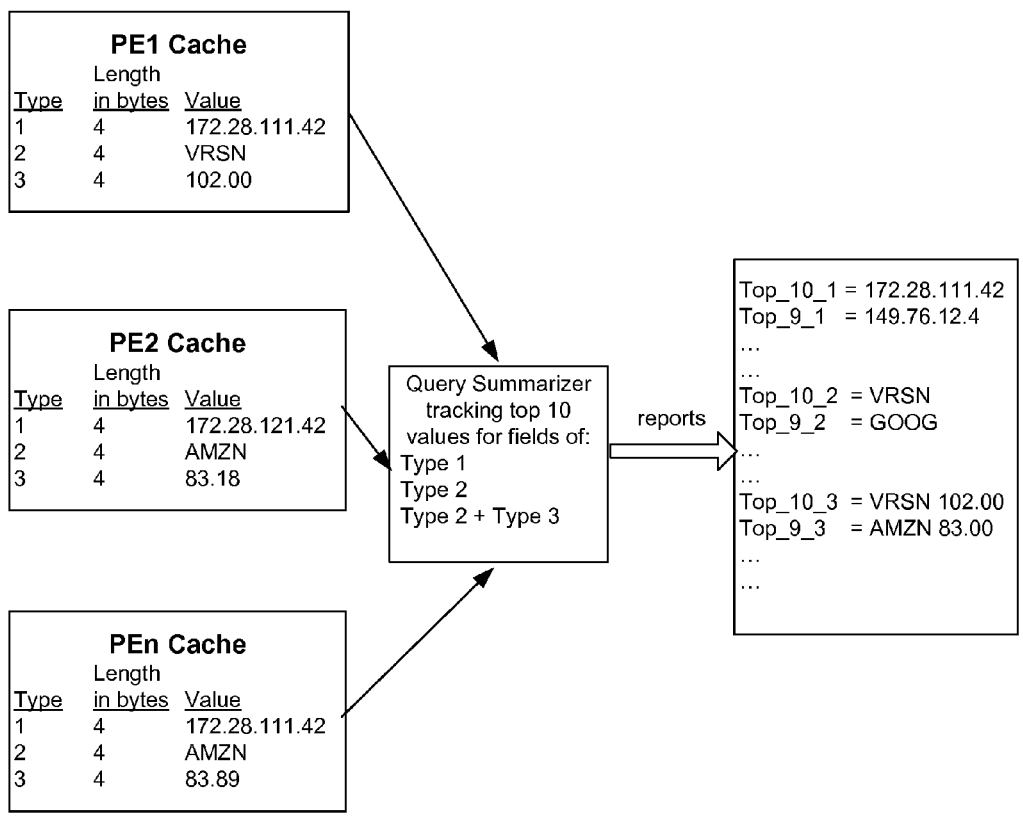
FIG. 9 illustrates caches and a report summarizing logged Internet requests.

FIG. 9 illustrates caches and a report summarizing logged Internet requests. As illustrated in FIG. 9, caches for three different processing engines PE1, PE2, and PEn include various fields. The field types of interest include three fields for the source location, the stock ticker symbol, and the bid value in dollars. A request was received by PE1 from a source with a location of 172.28.111.42. Since the source location is a field type of interest, this source location was cached. Similarly, PE1 cached the stock ticker symbol VRSN from a request, as well as a value of 102.00 from a request including this particular bid value. Other fields are cached, in the format of type, length, and value, for other requests having fields matching the field types of interest. Similar caches are formed by PE2 and PEn.

Figure 5:
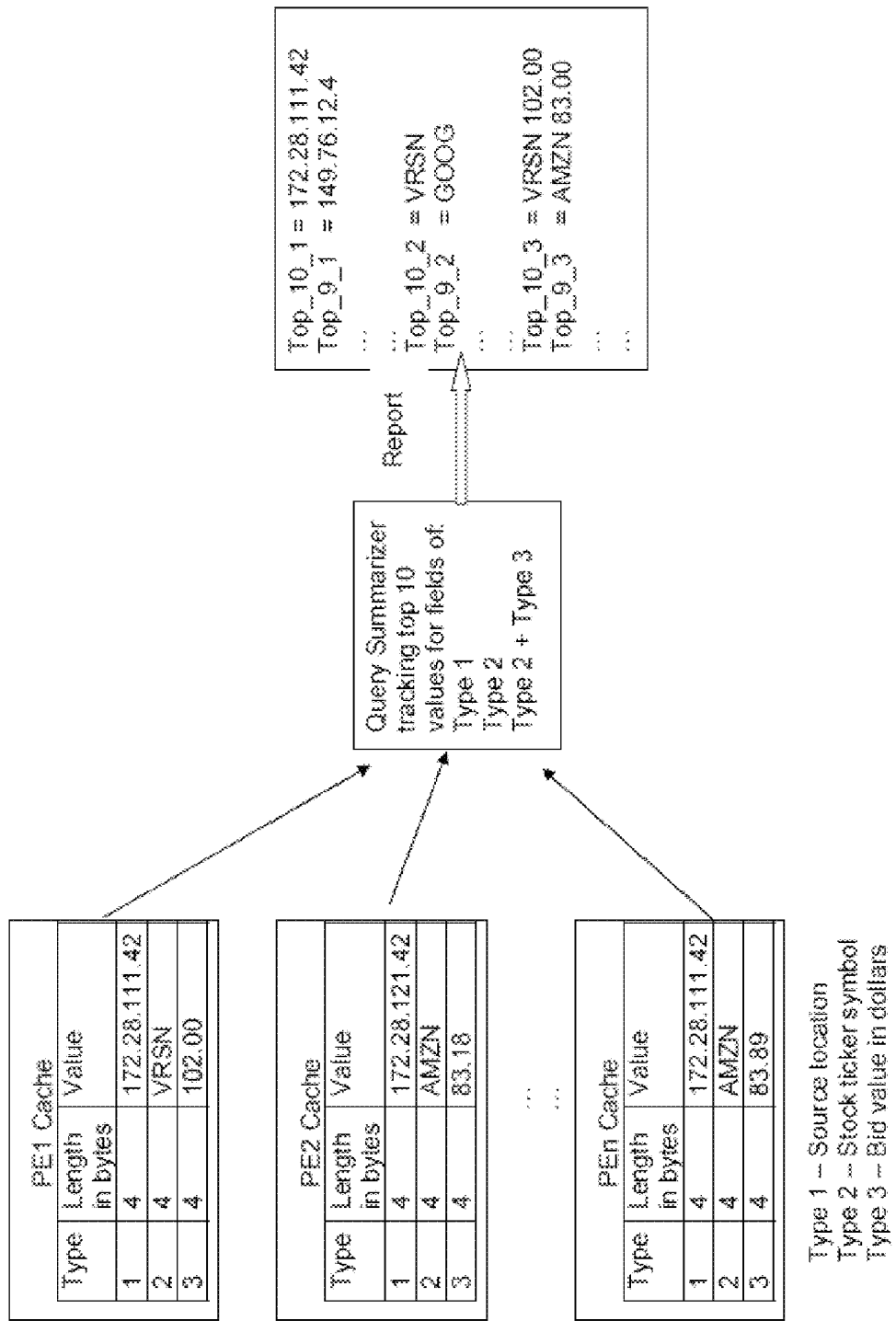
FIG. 5 is a simplified diagram illustrating an architecture of a query summarizer according to an embodiment of the present invention.

At the proper reporting interval, the caches are transmitted to the Query Summarizer, which forms the illustrated report. The Query Summarizer tracks the top 10 values for fields having fields matching the three field types of interest: Type 1, Type 2, and the combination of Type 2 and Type 3. The Query Summarizer receives the caches from the various PEs and then forms the illustrated report, showing the top 10 source locations, the top 10 stock ticker symbols, and the top 10 combinations of stock ticker symbols and bid values. As shown in FIG. 5, the top source location was 172.28.111.42, the top stock ticker symbol was VRSN, and the top stock ticker symbol and bid price combination was VRSN 102.00.

The Query Summarizer has the ability to report a number of different statistics. In an embodiment, the following statistics listed in Table 8 are reported.

TABLE 8

| | |
|---|---|
| cache_item_count | The number of distinct field type-length-value three-tuples in the current query log cache |
| cache_byte_size | The number of bytes consumed by the query log cache, which is the sum of the length values in each field type-length-value three-tuple |
| faulty_messages | The number of messages received from PEs that could not be successfully parsed (e.g., malformed, truncated, or the like) |
| missed_messages | The number of messages that the Query Summarizer believes it lost based on gaps in packet sequence numbers |

The QueryLogCache class is a component of the Query Summarizer. It keeps track of all queries/events being submitted by the PEs and how often they have been reported. It also provides the code used to return the top n hits for each tracked field type of interest. An example of the QueryLogCache is:

```
class QueryLogCache {
public:
    struct QueryCacheKey {
        unsigned short field_;
        unsigned char *value_;
        unsigned short size_;
    };
    struct TopNList {
        TopNList ( ) { }
        -TopNList ( ) { }
        unsigned short field_;
        vector<QueryCacheKey> matches
    };
    QueryLogCache ( );
    -QueryLogCache ( );
    void add (unsigned short field, const unsigned char *value,
    unsigned short size);
    void getTopN (unsigned maxNumMatches,
    DeleterForArrayOf<TopNList>&lists) ;
    void dump (ostream &out) const;
    void dump (unsigned short field, ostream &out) const;
```

```
    private:
        typedef map <uQueryCacheKey, unsigned> QueryCache__;
        DoubleBuffer<QueryCache> cache__;
};
```

The QueryLogCache::add( ) method is the method that will be called by the service thread in the query summarizer. The field type, length, and value, extracted from a message in a PE packet, will be passed to this method and committed to the query cache. The basic store for the cache is a map, keyed off of a struct containing the field type (which can be represented by a number), value, and length. If that three-tuple key can be found in the cache map, then the count for that three-tuple key is updated; otherwise, a new entry is added in to the cache. The cache itself is kept in a double buffer object so that the reporting and service threads can work independently on the cache.

The QueryLogCache::dump( ) methods are provided for debugging purposes only and will dump the cache contents for either the entire cache or for the indicated field. The result will be printed to the provided output stream.

The QueryLogCache::getTopN( ) method is to be called by the reporting thread when it comes time to build a report for the system administrator. The caller passes in a Array<QueryLogCache::TopNList> object which contains a QueryLogCache::TopNList object for each field being reported upon. The caller pre-fills each QueryLogCache::TopNList object's field_parameter with the field being tracked. This is done because qlogd may not be reporting on all fields that are fed to it by a PE. For example, if DNS names, types, and response codes are being tracked, and the field number for DNS names is 1, types is 2, and response codes is 5, then the caller would do the following to get the top 20 names and types:

```
    QueryLogCache::getTopN( ) call
    Array<QueryLogCache::TopNList> lists;
    lists.adopt(new QueryLogCache: :TopNList[fields__.size( )]);
    for (unsigned i = 0; i < fields .size( ); i++) {
        QueryLogCache: :TopNList &list = lists[i];
        list.field__ = fields__[i] .number_i
    }
    cache__.getTopN(20, lists) i
```

The list preparation could, of course, be done at initialization time. The method iterates over the cache and, for each item in the cache, adds the cache's key and its count, but reversed—that is, the second and first members of the iterator—into the appropriate field's QueryLogCache::TopNList object. Once completed, the vectors are sorted by the count values and everything but the last n items, if there are more than n items in the list, are deleted. The end result, then, is that the passed-in Array<QueryLogCache::TopNList> object will contain the top n lists, ready to be massaged into a message for the system operator.

An example implementation of QueryLogCache::getTopN in pseudo-code is:

```
void QueryLogCache: :getTopN (unsigned maxNumMatches,
                Array<QueryLogCache: :TopNList>
topLists) {
    PRECONDITION(maxNumMatches > 0);
    PRECONDITION(topLists.size( ) > 0);
    // Grab current cache, publish new, blank one
    QueryCache *current = cache__.getCurrentPtr( );
    for (map<QueryCacheKey, unsigned>::const__iterator it = current
>begin;
            it ! = current->end ( ); it++) {
        const QueryCacheKey &entry = it->first;
        unsigned count = it->second;
        // Find the right TopNList for this cache entry and add it in
        // as a count-key pair.
        for (unsigned i = 0; i < topLists.size( ); i++) {
            TopNList &topList = lists[i];
            if (topList.field__ == entry.field__) {
                topList.matches__.push__back(make-pair(count, entry));
                break;
            }
        }
    }
    for (unsigned i = 0; i < topLists.size( ); i++) {
        // Sort the list by the count (first) part of the pair
        TopNList &list = topLists[i];
        sort (list.matches__.begin( ) , list.matches__.end( ));
        // If the list has more than maxNumMatches, then delete all
        // but the last maxNumMatches.
        if (list.matches .size( ) > maxNumMatches) {
            list.matches__.erase(list.matches__.begin( ),
                    list.matches .end( ) - maxNumMatches);
        }
    }
}
```

The QueryLogServer class is another component of the Query Summarizer. An example implementation of QueryLogServer class in pseudo-code is:

```
class : public Server {
public:
    QueryLogServer ( );
    -QueryLogServer ( );
    // Run the reporter thread which builds the top-n lists and sends
    // them off to the management console
    void report ( );
private:
    string transformValue (QueryLogCache: : QueryCacheKey &entry);
    QueryLogCache cache__;
    ConditionLock condition__;
};
```

The Query Summarizer's primary service thread reads the caches sent from the PEs. An example of the Query Summarizer's primary service thread in pseudo-code is:

```
start reporter thread
QueryLogCache newCache
while (!isShuttingDown( )) {
    read message from socket
    for (each message in packet) {
        if (time to report or cache size is too large) {
            QueryLogCache *oldCache = 0;
            cache__.writeUpdatePtr (newCache.orphan ( ) &oldCache);
            if (oldCache) {
                delete oldCache;
            }
            newCache.adopt(new QueryLogCache);
            ConditionLock clock (condition__) ;
            clock.signal( ) ;
        }
        // Add each field into cache
        for (each field in message) {
            newCache.add(field number, value, value length);
        }
        // Construct dynamic fields (defined in configuration) and
        // add results into cache
        for (each constructed field)
            string result;
```

```
        for (each token in constructed field) {
            result += token;
        }
        newCache.add(constructed field number, result.data( ),
                result.length( )) i
     }
   }
}
shut down reporter thread
```

The Query Summarizer's transform value method transforms a match's field value into string format for inclusion in a report for the system operator. How the transformation is performed depends on the field's configuration and specifically, the field_#. type configuration parameter. If a type is not provided, then the binary format is assumed and a hex dump of the field's value is performed. The following transformations illustrated in Table 9 are supported:

TABLE 9

| Type | Source Format | Source Length | Action |
|---|---|---|---|
| string | Arbitrary | Arbitrary | escapeChars ( ) |
| lcstring | Arbitrary | Arbitrary | toLower ( ), followed by escapeChars ( ) |
| ucstring | Arbitrary | Arbitrary | toUpper ( ), followed by escapeChars ( ) |
| short | Network byte order | 2 bytes | numberToString ( ) |
| integer | Network byte order | 4 bytes | numberToString ( ) |
| int64 | Arbitrary | 8 bytes | numberToString ( ) |
| Ip | IPv4 address, Network byte order | 4 bytes | getNumericString (IPv4 & addr) |
| ip6 | IPv6 address | 16 bytes | getNumericString (IPv6 & addr) |

The Query Summarizer's report method is responsible for retrieving the top n lists for all desired fields, transforming the raw data into a suitable format, and then sending the data on to a system administrator or suitable console/program. In pseudo-code:

```
QueryLogServer Reporter Thread
while (!isShuttingDown( )) {
    ConditionLock clock (condition_) ;
    clock. wait ( ) ;
    if (!isShutting Down) {
        for (each field to report) {
            QueryLogCache: :TopList &list topLists[il;
            list.field = ith field;
        }
        // Get the top n hits per field. This will also publish a new,
        // blank cache for the primary service thread to start writing
        // new counts.
        QueryLogCache *cache cache_.getCurrentPtr( );
        cache_.getTopN(numTopHits, topLists);
        // Create Report message
        add preliminaries to report;
        // Add actual top n lists
        for (each field to report) {
            for (each match in field's top-n list) {
                string textualValue = transformValue(entry);
                add to report;
            }
        }
        send to Report messaging server;
    }
}
```

The Query Summarizer reports to the management console the top n lists for all fields which it has been configured to track. The interval at which reports are sent is controlled via the reporting_interval configuration parameter. According to a particular embodiment of the present invention, each report will be structured as illustrated in Table 10.

TABLE 10

| Name | Value |
|---|---|
| Host | Name of server running qlogd (without qualifying domain name) |
| Domain | Domain name of server running qlogd. Alternatively "(none)" |
| start_seconds | Time when qlogd started |
| start_useconds | Number of additional use conds when qlogd started |
| now_seconds | Time of report |
| now_useconds | Number of additional useconds of time of report |
| field<FI> 0 | The top n occurring values for fields F1, F2, . . . Fk, |
| field<FI> 1 | where F1, F2, . . . Fk are replaced with the |
| . . . | fields' numbers |
| field<FI> n | |
| field<F2> 0 | |
| field<F2> 1 | |
| . . . | |
| field<F2> n | |
| . . . | |
| field<Fk> 0 | |
| field<Fk> 1 | |
| . . . | |
| field<Fk> n | |

An example of a report, with arbitrary names, values, and the like is provided below. The example bears no resemblance to real data, but is merely provided by way of example. In addition, DNS types and response codes have been translated into their readable mnemonics for the sake of readability.

```
BEGIN 550 87176982
TO=host.dns.topqueries
FROM=host
TYPE=DATA
SEQ=1234
host=host
domain=(none)
start seconds=1190217552
start useconds=2
now seconds=1190217542
now useconds=12345
field17_0=www.example1.com. 1000
field17_1=www.example2.com. 999
field17_2=www.example3.com. 997
field17_3=www.example4.com. 74
field17_4=www.example5.com. 2
field18_0=A 2274
field18_1=NS 307
field18_2=MX 20
field18_3=SOA 6
field18_4=TXT 4
field19_0=NOERROR 2764
field19_1=NXDOMAIN 276
field19_2=REFUSED 30
field19_3=FORMERR 1
field19_4=NOTIMP 1
```

The PEs and the Query Summarizer include a processor coupled to a memory that stores instructions adapted to be executed by the processor to perform at least part of the method in accordance with an embodiment of the present invention. The processor can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware.

As an example, such processors include dedicated circuitry, ASICs, combinatorial logic, other programmable processors, combinations thereof, and the like. The memory can be any device capable of storing digital information, such as RAM, flash memory, a hard disk, a CD, etc. The processor can be coupled to a database that can store field types of interest, caches, lists of sorted fields, reports, or other pertinent information.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of caching internet requests, the method comprising:
    identifying a plurality of user-defined field types of interest;
    receiving a request from the internet, wherein the request includes one or more fields;
    determining that a first field type of a first field of the one or more fields matches one of the plurality of user-defined field types of interest;
    caching at least a portion of the first field in a cache based on the determination that the first field type of the first field of the one or more fields matches one of the plurality of user-defined field types of interest;
    determining that a second field type of a second field of the one or more fields matches one of the plurality of user-defined field types of interest;
    caching at least a portion of the second field in the cache based on the determination that the second field type of the second field of the one or more fields matches one of the plurality of user-defined field types of interest;
    transmitting the cache to a server;
    determining, at the server, a number of occurrences of a field value of at least one of the first field type or the second field type in the cache; and
    providing a report including the number of occurrences of the field value.

2. The method of claim 1 wherein determining that the first field type matches one of the plurality of user-defined field types is performed at a resolution site.

3. The method of claim 1 further comprising not caching a third field of the one or more fields, wherein a third field type of the third field does not match one of the plurality of user-defined field types.

4. The method of claim 1 further comprising, receiving, at the server, a cache from each of a plurality of processing engines.

5. The method of claim 1 further comprising transmitting the report to a system operator.

6. The method of claim 1 wherein the portion of the first field is a field type, field length, and field value for the first field and the portion of the second field is a field type, field length, and field value for the second field.

7. The method of claim 1 wherein each of the one or more fields is characterized by at least a field type, a field length, and a field value.

8. The method of claim 1 wherein defining the plurality of user-defined field types is performed prior to receiving the request from the internet.

9. A method of reporting on internet requests, the method comprising:
    identifying a plurality of user-defined field types of interest;
    receiving a first plurality of requests from the internet at a first processing engine, wherein each of the first plurality of requests includes one or more first fields;
    determining that a first field type of a first field of the one or more first fields matches one of the plurality of user-defined field types of interest;
    caching the first field of the one or more first fields in a first cache based on the determination that the first field type of the first field of one or more first fields matches one of the plurality of user-defined field types of interest;
    determining that a second field type of a second field of the one or more first fields matches one of the plurality of user-defined field types of interest;
    caching the second field of the one or more first fields in the first cache based on the determination that the second field type of the second field of the one or more first fields matches one of the plurality of user-defined field types of interest;;
    receiving a second plurality of requests from the internet at a second processing engine, wherein each of the second plurality of requests includes one or more second fields;
    caching a third field of the one or more second fields in a second cache;
    caching a fourth field of the one or more second fields in the second cache;
    transmitting the first cache to a server;
    transmitting the second cache to the server;
    determining, at the server, a top field value characterized by a higher number of occurrences than other field values; and
    providing a report including the top field value and the number of occurrences of the top field value.

10. The method of claim 9 wherein the report comprises a list sorted by the number of occurrences of values from the cached fields.

11. The method of claim 9 further comprising:
    determining, at the first processing engine, that a field type of the first field matches one of a plurality of user-defined field types prior to caching the first field;
    determining, at the first processing engine, that a field type of the second field matches one of the plurality of user-defined field types prior to caching the second field;
    determining, at the second processing engine, that a field type of the third field matches one of the plurality of user-defined field types prior to caching the third field; and
    determining, at the second processing engine, that a field type of the fourth field matches one of the plurality of user-defined field types prior to caching the fourth field.

12. The method of claim 9 wherein the first plurality of requests and the second plurality of requests comprise at least one of DNS requests, IP requests, OCSP requests, or Whois requests.

13. The method of claim 9 wherein the first plurality of requests and the second plurality of requests comprise at least one of VoIP requests or IM requests.

14. A system comprising:
    a plurality of processing engines coupled to the internet and operable to receive requests from the internet, each of the requests including one or more fields;
    a server coupled to the plurality of processing engines; and
    a reporting system coupled to the server, wherein each of the plurality of processing engines includes a first computer-readable medium storing a first plurality of instructions for controlling a first data processor to form a cache, the first plurality of instructions comprising:

instructions that cause the first data processor to received a plurality of requests over the Internet;

instructions that cause the first data processor to store, in the cache, field values for user-defined field types of interest for one or more fields included in a subset of the plurality of requests received over the Internet, based on the determination that the field types of the one or more fields included in the subset of the plurality of requests match the user-defined field types of interest;

instructions that cause the first data processor to increment a counter associated with the a total number of the subset;

instructions that cause the first data processor to determine a time period for forming the cache; and instructions that cause the first data processor to transmit the cache to the server, wherein the server includes a second computer-readable medium storing a second plurality of instructions for controlling a second data processor to form a report, the second plurality of instructions comprising:

instructions that cause the second data processor to increment counters associated with field values for the plurality of user-defined field types;

instructions that cause the second data processor to sort the field values based on the counters; and instructions that cause the second data processor to transmit the report to the reporting system.

15. The system of claim 14 wherein the requests comprise at least one of DNS requests, IP requests, OCSP requests, or Whois requests.

16. The system of claim 14 wherein the plurality of processing engines are located at a resolution site.

17. The system of claim 16 wherein the resolution site is a component of a DNS resolution system.

18. The system of claim 14 wherein caching the first field comprises storing a field type, a field length, and a field value.

19. The system of claim 14 wherein the cache is transmitted to the server based on passage of a time interval.

20. The system of claim 14 wherein the cache is transmitted to the server based on reaching a cache size limit.

21. The system of claim 14 wherein the server comprises a service thread and a reporter thread.

* * * * *